Patented Aug. 12, 1952

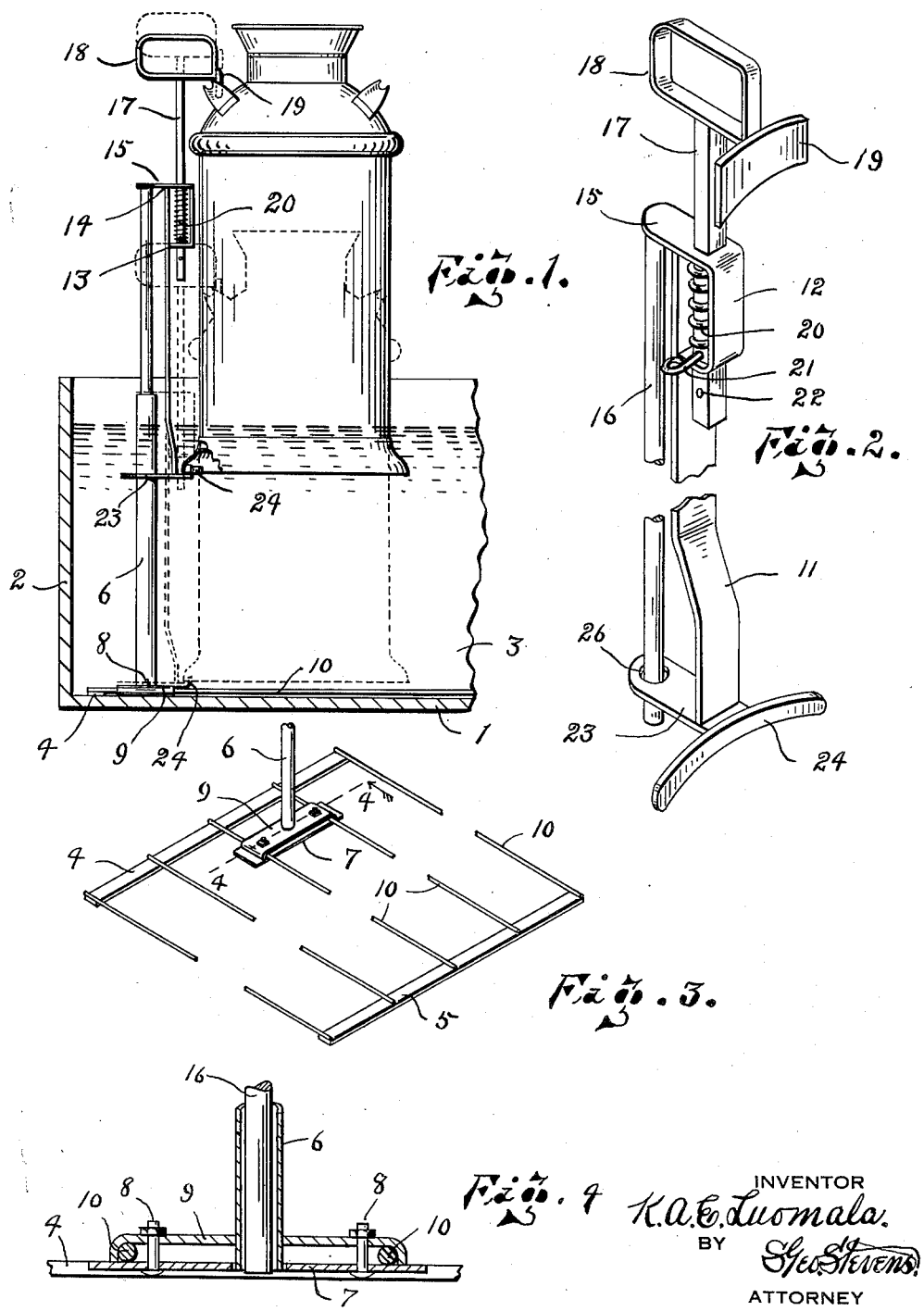

2,606,732

UNITED STATES PATENT OFFICE 2,606,732

MILK CAN HANDLING DEVICE

Karl Adolf Ernest Luomala, Cloquet, Minn.

Application April 28, 1947, Serial No. 744,489

1 Claim. (Cl. 248—154)

This invention relates to the art and apparatus for handling milk and especially at the time of initially cooling of fresh milk.

The principal object sought is that of avoiding the necessity of heavy lifts during the installation of filled cans of milk into the cooling tanks immediately after milking.

Another object is to provide a simple and convenient device especially well adapted for use by the women on ordinary dairy farms or other persons not capable of repeated heavy lifting such as necessitated by the placing of filled cans of milk into a cooling tank as commonly practiced on the ordinary dairy farm.

Still another object is to provide a can holding instrumentality most conveniently prearranged for operation in various positions within the cooling tank.

Still other objects and advantages will develop during the further explanation of the invention.

In the accompanying drawing forming part of this application:

Fig. 1 is a vertical sectional view of one corner of a milk cooling tank equipped with one of my improved milk can holders.

Fig. 2 is an enlarged perspective view of the portable can adapter portion of the holder.

Fig. 3 is a reduced broken perspective view of the portable rack-like carrier for the holder, and Fig. 4 is an enlarged vertical sectional view on the line 4—4 Fig. 3.

The reference numerals 1—2 and 3 represent respectively portions of the bottom, end and side of a common milk cooling tank such as found on an ordinary dairy farm.

The reference numerals 4 and 5 represent flat metal end bars of the portable base rack for the main tubular mast 6 of the support. The mast 6 has fixed to the lowermost end thereof the elongated metal base plate 7 carrying the upstanding spaced bolts 8—8 therethrough for adjustable reception of the selective spanner member 9 which obviously may be fitted over any two of the spaced floor rods 10 of the rack, the rods being fixed to the upper face of each end bar 4 and 5 so as to permit of ready sliding of the mast 6 upon the pair of rods 10 engaged without frictionally engaging the floor member 1 of the cooling tank.

The adapter member shown in Fig. 2 comprises the flat metal bracket-like main body portion 11 which carries at its upper end an additional flat member 12 fixed thereto as at 13—14 forming the box-like housing, the upper flat portion of this member 12 extends rearwardly of the main body portion as at 15. To this rearward extension 15 is rigidly fixed the main stem 16 for free vertical telescopic engagement within the tubular mast 6. Through the upper and lower walls of the box-like housing are suitable openings for the slidable reception of the handle stem 17 which has at its upper end an operating handle 18 on the inner edge member of which is attached a milk can handle engaging preferably arcuately shaped dog 19. Mounted on the handle stem 17 is a suitable expansive helical spring 20 which at all times will bias the handle and stem down to the limit of the pin stop 21, the spring 20 being held within the housing between the pin 21 and the upper wall of said housing.

There are provided on the stem 17 any suitable number of pin receiving openings 22 as desired to allow selectivity as to the size of can to be handled by the device.

At the lower end of the main body portion 11 is carried the base member 23, at the inner end of which is fixed the arcuately shaped shoe member 24 for ready overlapping engagement by a milk can bottom flange indicated at 25.

The outwardly extending or guide portion of the base member 23 has a suitable opening 26 through which the main stem 16 normally extends as shown in Fig. 2. This opening 26 is of suitable size so as to be slidably fitted around the main mast 6 to act as a stabilizer and guide for the adapter unit and can as they slide downwardly or are lifted upwardly in operation.

In operation, the adapter unit is applied to an empty milk can remote from the cooling tank. The empty can and adapter are then lifted into position so that the stem 16 is inserted within the tubular mast 6 and the guide member is in guiding position externally of said mast. The can will normally float on the water in the cooling tank so as to appear approximately as shown in Fig. 1. A milk strainer may then be inserted into the can opening and fresh milk to be cooled may be poured therethrough and into the can. As the can is filled it gradually sinks into the water due to the added weight of the milk, but at all times being guided by the device, until it ultimately reaches the bottom of the tank as shown in dotted lines Fig. 1.

After a can is thus filled, a slight upward pull on the handle 18 will release the dog 19 when the can may be readily tipped and disengaged from the shoe 24 and then rolled or slid into a remote part of the cooling tank leaving the adapter free to be used immediately in repeating the process.

It is deemed apparent from the above, that a great deal of heavy lifting and unnecessary work will be saved in employing the instant invention on a dairy farm.

Having thus described my invention, what I claim is:

In a device for handling milk cans; a vertical tubular mast, and an adapter unit for selective telescopic engagement with said mast, said adapter unit comprising a body portion, a handle, a can handle engaging dog attached to said handle, spring means to bias said dog towards engagement with a handle of said can, a can-flange engaging shoe at the lower end of said body portion, and a stem carried substantially parallel to and adjacent said body portion, said stem being adapted to be telescopically carried by said mast in handling said cans.

KARL ADOLF ERNEST LUOMALA.

REFERENCES CITED

The following references are of record in the file of this patent:

UNITED STATES PATENTS

| Number | Name | Date |
| --- | --- | --- |
| 808,093 | Kleiber | Dec. 26, 1905 |
| 970,872 | Babcock | Sept. 20, 1910 |
| 1,436,814 | Markert et al. | Nov. 28, 1922 |
| 1,569,793 | Tomhave | Jan. 12, 1926 |
| 1,799,079 | Bemis | Mar. 31, 1931 |
| 1,869,284 | Swanson | July 26, 1932 |
| 1,885,788 | Westburg | Nov. 1, 1932 |
| 2,074,212 | Conner | Mar. 16, 1937 |
| 2,462,375 | Flaherty | Feb. 22, 1949 |

FOREIGN PATENTS

| Number | Country | Date |
| --- | --- | --- |
| 33,890 | Switzerland | Apr. 19, 1905 |